MAGNETIC HEAD MOUNT APPARATUS

Filed May 20, 1963 4 Sheets-Sheet 1

INVENTORS
ROBERT G. GROOM
SHAHBUDDIN A. BILLAWALA
ALPHEUS F. STANSELL
BY
Christie, Parker & Hale
ATTORNEYS.

MAGNETIC HEAD MOUNT APPARATUS

Filed May 20, 1963

4 Sheets-Sheet 2

INVENTORS.
ROBERT G. GROOM
SHAHBUDDIN A. BILLAWALA
BY ALPHEUS F. STANSELL

Christie, Parker & Hale
ATTORNEYS.

INVENTORS.
ROBERT G. GROOM
SHAHBUDDIN A. BILLAWALA
ALPHEUS F. STANSELL
BY
Christie, Parker & Hale
ATTORNEYS.

MAGNETIC HEAD MOUNT APPARATUS

Filed May 20, 1963

4 Sheets-Sheet 4

INVENTORS.
ROBERT G. GROOM
SHAHBUDDIN A. BILLAWALA
BY ALPHEUS F. STANSELL

Christie, Parker & Hale
ATTORNEYS.

United States Patent Office 3,310,792
Patented Mar. 21, 1967

3,310,792
MAGNETIC HEAD MOUNT APPARATUS
Robert G. Groom, La Crescenta, Shahbuddin A. Billawala, Pasadena, and Alpheus F. Stansell, West Covina, Calif., assignors to Burroughs Corporation, Detroit, Mich., a corporation of Michigan
Filed May 29, 1963, Ser. No. 281,504
12 Claims. (Cl. 340—174.1)

This invention relates to magnetic recording heads for reading and writing on a magnetic recording surface and, more particularly, to improved mounting arrangements for such magnetic recording heads.

Magnetic recording heads of the type commonly used for reading and writing on magnetic recording means such as rotating magnetic recording disks and rotating magnetic recording drums are often used for recording digital information at extremely high densities. As the density at which digital information is recorded on a magnetic recording surface is increased, the gap between the magnetic recording head and the magnetic recording surface must be decreased. The smaller the gap and the closer the magnetic head is positioned with respect to the magnetic recording surface, the more difficult it becomes to control the mechanical tolerances of the structure mounting the recording head. To overcome these mechanical difficulties, mechanical recording heads are placed in recording head assemblies adapted for floating on a thin film of air caused by the moving magnetic recording surface.

Floating magnetic recording head assemblies are often mounted in gimbal mounting devices in order to allow the angle and position of the magnetic recording head assembly to conform to the air bearing. Normally, gimbals are arranged for free frictionless rotation. However, a completely free moving and frictionless gimbal is undesirable for floating magnetic recording head assemblies. Such an arrangement is undesirable since small air turbulence as the head assembly is being moved into a floating position with respect to the magnetic recording surface can cause the head assembly to rotate and strike the recording surface thereby causing damage to the recording surface and/or the head assembly. Also, the position and angle of a head assembly mounted in a free frictionless gimbal is unstable. Therefore, as the head is moved into a recording position, it may quite possibly rotate at an angle allowing the edge or corner of the head assembly to strike the recording surface.

In order to overcome the aforementioned disadvantages, springs have been used to provide restrained movement of the head assembly in the gimbal mount. As an alternative, gimbal mounts have been arranged so that the gimbal bearings have a considerable amount of friction so as to provide restrained movement of the head assembly. However, both of these arrangements are generally quite complex requiring accurately machined parts and precision bearings. As a result, the cost of such an arrangement is quite prohibitive in a system where a very large number of head assemblies are to be used. Additionally, the arrangement wherein friction is applied to the gimbal bearings is generally undesirable and since each time the head is moved into a floating position, the head may be at a different angle. Thus, the edge or the corner of the head assembly may engage the recording surface.

Additionally, many prior art gimbals for mounting magnetic recording heads have play in the bearings and structure thereof and allow head assemblies mounted thereto to rotate around an axis perpendicular to the recording surface or to move parallel with the recording surface. This cannot be tolerated at high recording densities.

In contrast, the present invention is directed to a head support apparatus for magnetic recording heads which has no bearings. Additionally, a head support apparatus constructed in accordance with the present invention inhibits rotation of a connected magnetic recording head assembly around an axis perpendicular to the recording surface and also inhibits any movement of the head assembly in a plane parallel with the recording surface. Further, each time the magnetic recording head is actuated into a floating position with respect to a recording surface, the head assembly approaches the recording surface at the same angle. Also, a head support apparatus constructed in accordance with the present invention is formed of a single piece of deformable material which provides a spring return for normally tending to retract the head assembly from the recording surface, provides essentially gimbaled action and yet provides restrained movement of the head in response to forces applied thereto so as to impart stability to the floating head assembly. The cost of a head support device constructed in accordance with the present invention is approximately 1/100 of that of known prior art floating head support devices having gimbaled action.

Briefly, an embodiment of the present invention comprises a member adapted for floating on a fluid atmospheric bearing and a support device comprising an elastic body structure coupled to the member for inhibiting movement of the member parallel with a plane therethrough and including perforations therein for adapting the body structure to permit restrained rotational movement of the member about a pivot point thereon.

These and other aspects of the present invention may be more fully understood with reference to the following description of the figures of which:

Figures 1, 2:
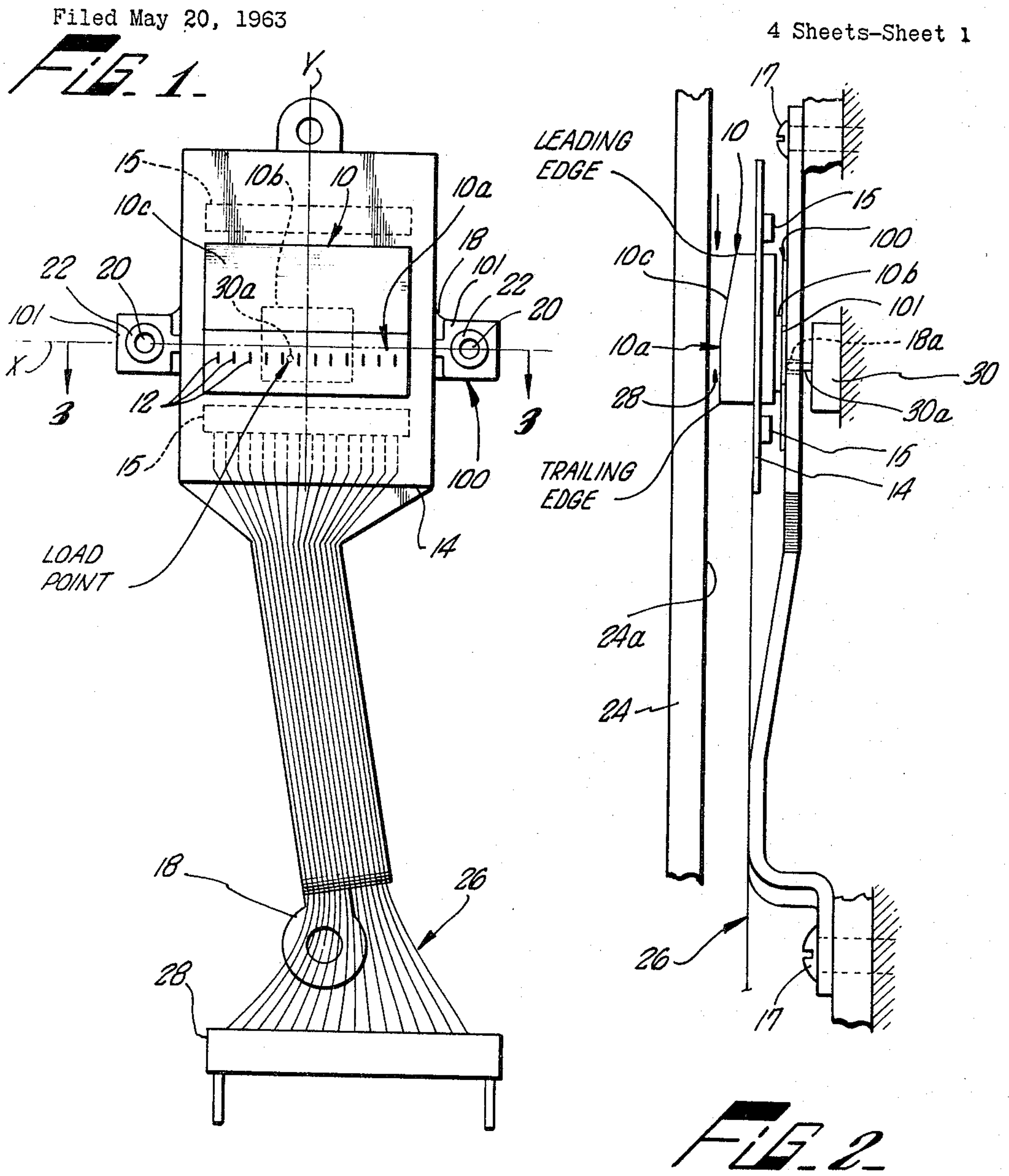
FIG. 1 is a plan view of a magnetic recording head assembly, and associated mechanical and electronic devices, mounted on a head support device and embodying the present invention.
FIG. 2 is a side elevation view of the magnetic recording head assembly associated mechanical and electronic devices and head support device shown in FIG. 1, with a portion of a rotating magnetic recording disk added adjacent the head assembly and shown with the rivets and washers for securing the head support device and the electrical connector removed.
Figure 3:
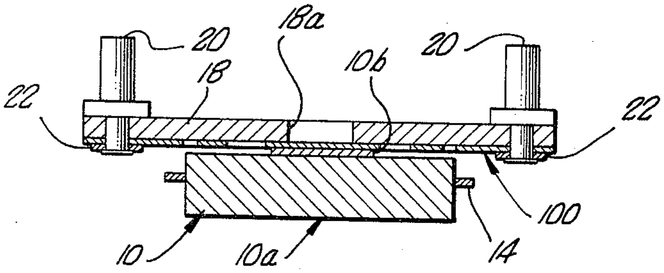
FIG. 3 is a section view of the apparatus of FIG. 1 taken along the lines 3—3 with the actuating device removed.

Refer now to the magnetic recording apparatus shown in FIGS. 1, 2 and 3. A magnetic recording head assembly 10 is shown mounted by means of a mounting block **10*b* to a head support device 100. The magnetic recording head assembly 10 contains a plurality of small magnetic recording heads 12 similar to those normally used for reading and writing on rotating magnetic recording drums and disks. The magnetic recording head assembly 10 may be glued or attached by other well known means to the block 10*b* which in turn can be connected by similar means to the head support device 100**.

A printed circuit board 14 is provided for mounting electronic switching circuits 15 for switching the output signals of the magnetic recording heads 12. The printed circuit board 14 contains an aperture in which the magnetic recording head assembly 10 is inserted and is securely attached to the magnetic recording head assembly 10.

The head support device 100 is attached to a support member or device 18 by means of rivets 20 and washers 22. The support device 18 is connected by screws 17 to a reference structure which supports the support device 18 and connected structure near the recording surface of a rotating magnetic recording disk 24.

The rotating magnetic recording disk 24 rotates at a sufficiently high velocity to form an air bearing adjacent a magnetic recording surface **24*a* upon which the magnetic recording head assembly 10 floats while reading and writing. The air bearing is depicted generally at 28 in FIG. 2. Thus, the magnetic recording means or disk 24 including the recording surface 24*a* rotates in air, which may be referred to as an atmospheric fluid, and forms an air bearing, which may be referred to as a fluid bearing, adjacent the recording surface 24*a***.

The magnetic recording head assembly 10 has bearing surface **10*a* which rests upon the air bearing 28 when the head assembly 10 is actuated into a floating position. The bearing surface 10*a* includes a beveled surface 10*c* formed to provide the desired floating characteristics for the head assembly 10 when it is in a floating position on the air bearing. The bearing surface 10*a* is meant to refer generally to the whole surface which is adjacent to surface of the magnetic recording disk 24**.

Electrical conductors 26 are provided for coupling the output of the electronic switching circuits 15 to a conventional electrical connector 28.

A head actuating device 30 is provided having a plunger **30*a* which extends through an aperture 18*a* in the gimbal support structure 18. The head actuating device 30 includes a control device (not shown) for selectively placing the plunger 30*a* in either an actuated or deactuated position. Whenever the plunger is in an actuated position, the head support device 100 is forced towards the magnetic recording medium 24 and the magnetic recording head assembly 10 is forced into a floating position on the air bearing 28. When the plunger 30*a* is in a deactuated position, the head support device 100 automatically retracts the magnetic head assembly 10** away from the surface of the magnetic recording medium into a neutral or non-floating position as shown in FIG. 2.

Figure 4:
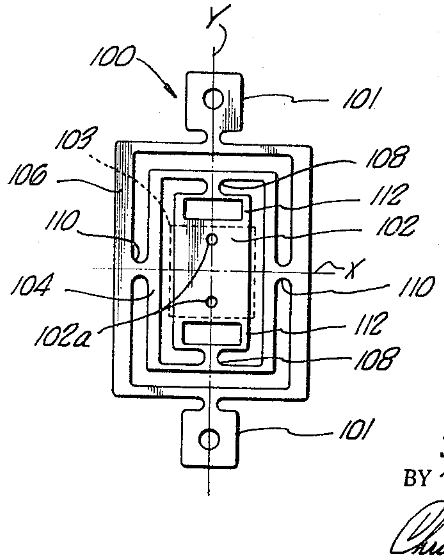
FIG. 4 is a plan view of the head support device shown in FIGS. 1, 2, and 3.

Refer now to the plan view of the head support device 100 referred to in regard to FIGS. 1, 2 and 3, which is shown in FIG. 4. The head support device 100 is a substantially flat body structure or plate. The head support device 100 is composed of an elastic material such as heat treated berylium copper which will deform under an applied force but which normally returns to a flat condition when such force is removed. The head support device 100 has a pair of ears 101 extending out from the rest of the head support device (see also FIGS. 1, 2 and 3). The ears 101 include apertures which allow the head support device 100 to be attached to mounting structure by means of the rivets 20 and washers 22 as shown in FIGS. 1, 2 and 3. The body structure of the head support device 100 also includes a plurality of perforations arranged so as to define a rectangular head support member 102, an inner rectangular support member 104 and an outer rectangular support member 106. The head support member 102 is rectangular and includes apertures **102*a* through which rivets or screws may be extended into the base structure 10*b* of a head assembly 10 connected thereto as shown in FIGS. 1, 2 and 3. The rectangular head support member 102 is connected by means of a pair of connecting members 108 to the inner rectangular support member 104. The connecting members 108 are connected at opposite points along the edges of the head support member 102. The rectangular inner support member is connected by means of a pair of connecting members 110 to the outer rectangular support member 106. The connecting members 110 are connected at opposite points along the edges of the inner support member 104**.

Two perpendicular dashed center lines are shown in FIG. 4 to represent an X and a Y axis of the head support device 100. The connecting members 108 and 110 and the inner and outer support members 104 and 106 inhibit any movement of the head assembly 10 (see FIGS. 1, 2 and 3) and head support member 102 parallel with the surface of the head support member 102. Since the plane of the head support device 100 when in a floating position is essentially parallel with the recording surface **24*a* shown in FIG. 2, the head support device 100 also inhibits movement of the head assembly 10 and head support member 102 parallel with the recording surface 24*a*. However, if a rotational force is applied to the head support surface 102 about the Y axis, the inner and outer support members 104 and 106 and the connecting members 108 and 110 deform and thereby allow such rotational movement of the head support member 102 (and connected head assembly. However, since the head support device 100 is actually a spring formed of an elastic material, the rotational movement is restrained and as the rotational force is removed, the head support device 100 automatically returns the head support member 102** (and connected head assembly) to its normal position.

Similarly a rotational force applied to the head support member 102 about the X axis causes the members 104, 106, 108 and 110 to deform and allow restrained rotational movement of the head support member 102. However, the head support device 100 automatically returns the head support surface 102 to its normal position as such rotational force is removed.

Thus, the head support device 100 provides gimbaled action defined herein as being rotation about a pivot point on the head support member 102. Normally, the gimbaled action is about the pivot point formed by the plunger **30*a***.

Figure 5:
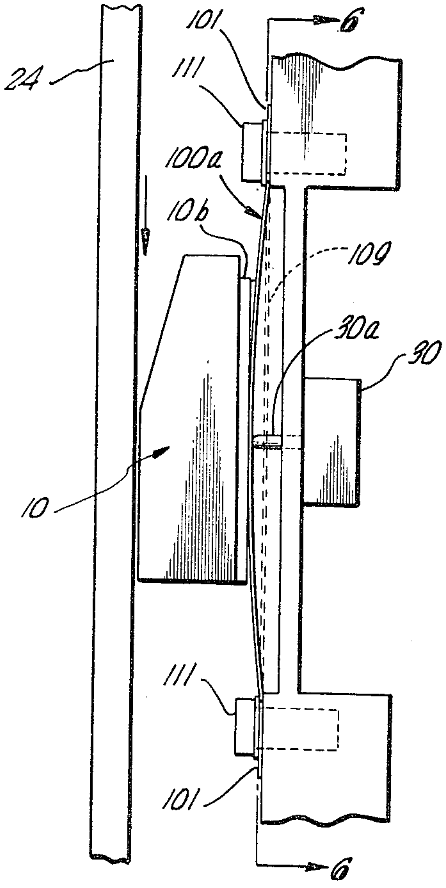
FIG. 5 is a side elevation view of a magnetic recording head assembly mounted on an alternate head support device adjacent a portion of a rotating magnetic recording disk and shown with the magnetic recording head assembly actuated onto an air bearing formed by the rotating magnetic recording disk and embodying the present invention.

Similarly, a force normal to the plane of the head support device 100 such as that illustrated for head support device 100 in FIG. 5 causes the members 104, 106, 108 and 110 to deform and allow restrained movement of the head support member 102 (and connected head assembly) perpendicular to the plane of the head support device 100 (along a line perpendicular to the X and Y axes). Thus, the head assembly connected to the head support member 102 may be actuated onto an air bearing formed by a moving magnetic recording surface such as at 24 in FIG. 2.

One of the more important aspects of a head support device for a magnetic head assembly constructed in accordance with the present invention, such as head support device 100, is its ability to accurately guide a head assembly into a floating position. With reference to FIG. 1, it will be noted that the load point of the plunger 30*a* is off of center of the head and gimbal 100 in both an X and a Y direction. The offset along the X direction is to compensate for the difference in pressure caused by the difference in velocity of the disk along a radial dimension of the disk. The offset along the Y direction is to provide a positive approach for the head with respect to the disk 24 as the head is being moved into a floating position. The positive approach is such that the leading edge of the head assembly is raised above the trailing edge, even further from the disk 24 than that caused by the bevel, causing the head to move smoothly into a floating position, thereby preventing the leading edge of the head assembly from the striking the disk 24. The head support device 100 provides gimbaled action as described hereinabove so that as the pressure of the air bearing builds up, as the head is being moved into a floating position, the head assembly adjusts itself essentially parallel with the surface of the disk 24.

The head support device 100 also has two rectangular perforations 112 formed in the head support member 102, one at either end adjacent the connecting members, 108. With a magnetic recording head connected to the head support device 100 as shown in FIGS. 1, 2 and 3, it has been found that the additional deflection allowed by the perforations 112 improves the operation of the head support device. The thin strip of material between the perforations 112 and the outer edges of the head support surface 102 provides the additional deflection under rotational and actuation forces on the head support device 100.

It should be noted that the base structure 10*b* of the head assembly 10 shown in FIGS. 1, 2 and 3 is small enough that it does not extend over the perforations 112 or the inner support member 104. A dotted line 103 in FIG. 4 illustrates the outline of the base structure 10*b* when fastened to the head support member 102.

It should be noted that head assemblies have been floated on an air bearing formed by a rotating magnetic recording disk with a disk to head gap of less than 100 microinches using a head support device as shown in FIG. 4.

Figure 6:
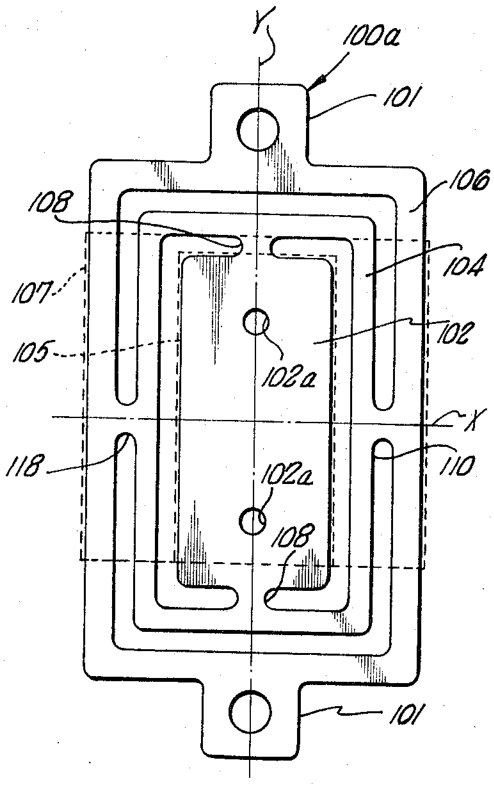
FIG. 6 is a plan view of the head support device shown in FIG. 5 taken along the lines 6—6 and shown with the gimbal in a deactuated condition.

Refer now to the alternate head support device shown in FIGS. 5 and 6. FIG. 5 shows a side elevation view of an alternate head support device 100*a* connected to a magnetic head assembly 10 which is actuated into a floating position with respect to a magnetic recording disk 24. FIG. 6 shows a plan view of the alternate head support device 100*a* taken along the line 6—6 of FIG. 5.

Referring specifically to FIG. 6, the alternate head support device 100*a* is similar to the head support device 100 in FIG. 4 except that the perforations 112 are eliminated from the head support member 102. Similar elements of the alternate head support device 100*a* to those of the head support device 100 in FIG. 4 are referenced by the same reference numbers. The head support device 100*a* is preferred to the head support device shown in FIG. 4 when the magnetic head assembly 10 is rotated 90° with respect to the head assembly 10 shown in FIG. 1. It should be noted that the head support device 100*a* is elongated along the line of movement of the magnetic recording disk 24 whereas the head support device 100 is elongated perpendicular to the movement of the recording disk 24 (see FIGS. 1 and 2).

The dotted line 105 illustrates the outline of the base structure 10*b* of a magnetic recording head assembly 10 mounted on the support member 102 of the head support device 100*a*. The dotted line 107 illustrates the outline of the magnetic recording head assembly 10.

FIG. 5 shows the head support device 100*a* mounted to a reference or support member by means of a pair of screws 111. FIG. 5 shows the head actuating device 30 in a condition wherein the plunger 30*a* forces the head assembly 10 into a floating position with respect to the disk 24. The dashed line 109 illustrates the position of the head support device 100*a* with the plunger 30*a* retracted and the head support device 100*a* in its normal retracted position.

Figure 8:
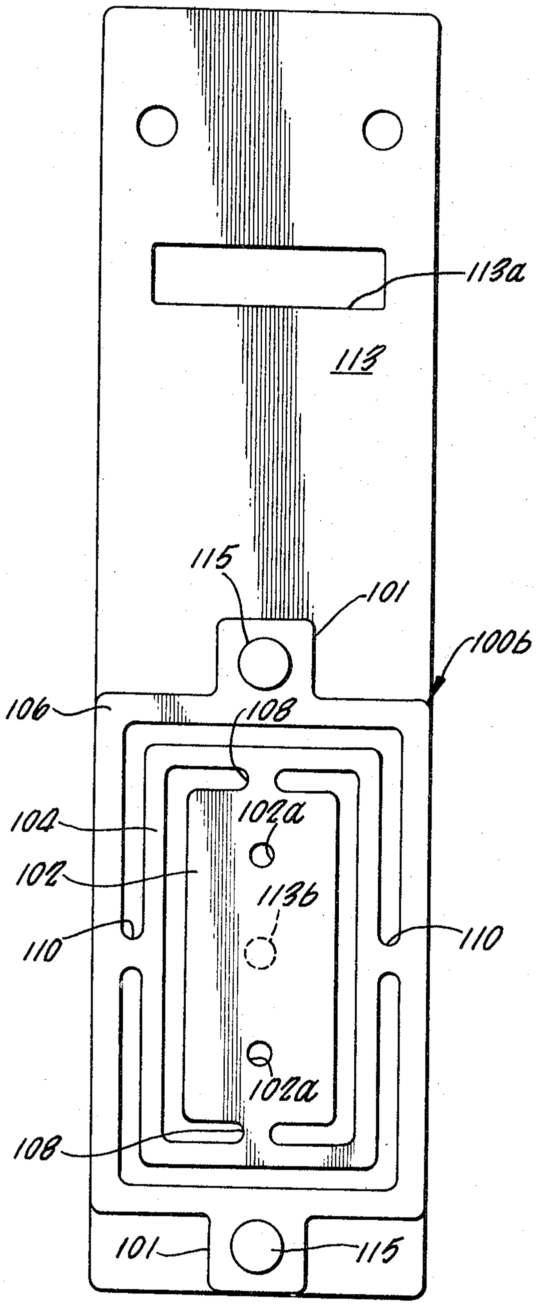
FIG. 8 is a plan view of the cantilevered head support device shown in FIG. 7 taken along the line 8—8.
Figure 7:
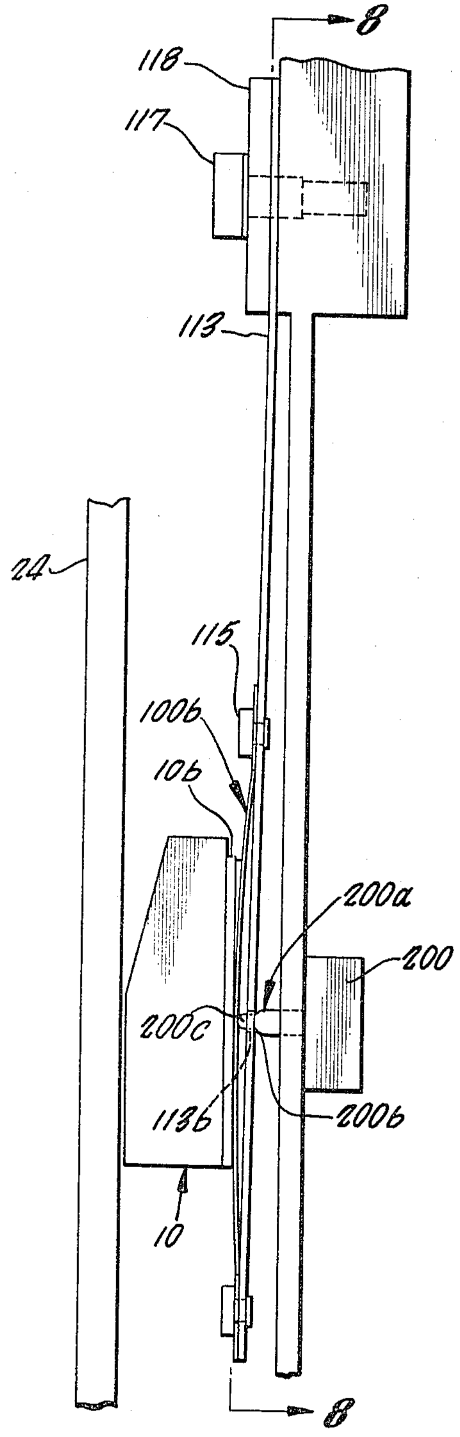
FIG. 7 is a side elevation view of a magnetic recording head assembly mounted on a cantilevered head support device adjacent a portion of a rotating magnetic recording disk and shown with the magnetic recording head assembly actuated onto an air bearing formed by the rotating magnetic recording disk and embodying the present invention.

Refer to the cantilevered head support device shown in FIGS. 7 and 8 and embodying the present invention. FIGS. 7 is a side elevation view of a head assembly 10 actuated into a floating position adjacent a rotating magnetic recording disk 24. Also shown is a side elevation view of a head support device 100*b* connected to a cantilever spring 113 and supporting the head assembly 10 and embodying the persent invention.

FIG. 8 shows a plan view of the head support device 100*b* connected to the cantilever spring 113 taken along the lines 8—8 of FIG. 7.

The head support device 100*b* is similar to the head support device 100*a* shown in FIGS. 5 and 6 and is attached by means of rivets 115 to a cantilever spring 113. The cantilever spring 113 is a flexible spring and made of an elastic material such as heat treated berylium copper. The cantilever spring 113 is attached to a base structure by means of a pair of mounting screws 117 and a pair of washers 118, only one of each pair being shown in the side elevation view of FIG. 7. A perforation 113*a* is formed in the cantilever spring 113 adjacent the connection to the mounting structure as shown in FIG. 8. The perforation 113*a* is formed in the spring 113 so as to provide more flexibility therein and reduce the required actuating forces therefor.

The cantilever spring 113 has an aperture 113*b* positioned so as to allow the end 200*c* of a plunger 200*a* to extend therethrough into engagement with the bottom side of the head support device 100*b*. The plunger 200*a* is actuated by a head actuating device 200 which is similar to the head actuating device 30 shown in FIGS. 2 and 4. The plunger 200*a* has a shoulder 200*b* which engages the outer edge of the aperture 113*b* and forces the cantilever spring 113 out towards the moving magnetic recording disk 24. The operation of cantilevered head support device of FIGS. 7 and 8 should be noted and is of importance. As the plunger 200*a* is moved out and forces the head 10 into a floating position, the end 200*c* of the plunger 200*a* first engages the bottom side of the head support device 100*b*. The head support device 100*b* deflects under the force exerted by the plunger 200*a* until the shoulder 200*b* engages the edges of the aperture 113*b*. The rest of the movement to the head floating position is made by the cantilever spring 113 which deflects under pressure by the plunger 200*a*. Thus, the amount of deflection provided by the head support device 100*b* is limited by the distance between the end 200*c* of the plunger 200*a* and the shoulder 200*b*.

The head support device 100*b* is similar to the head support device 100*a* of FIGS. 5 and 6. Like parts of the head support device 100*a* and 100*b* are designated by the same reference numbers.

One of the advantages of providing a cantilever spring such as 113 is to provide additional deflection and thereby allow the magnetic head 10 to be retracted further from the magnetic recording medium 24 when not reading or writing therewith.

Figure 9:
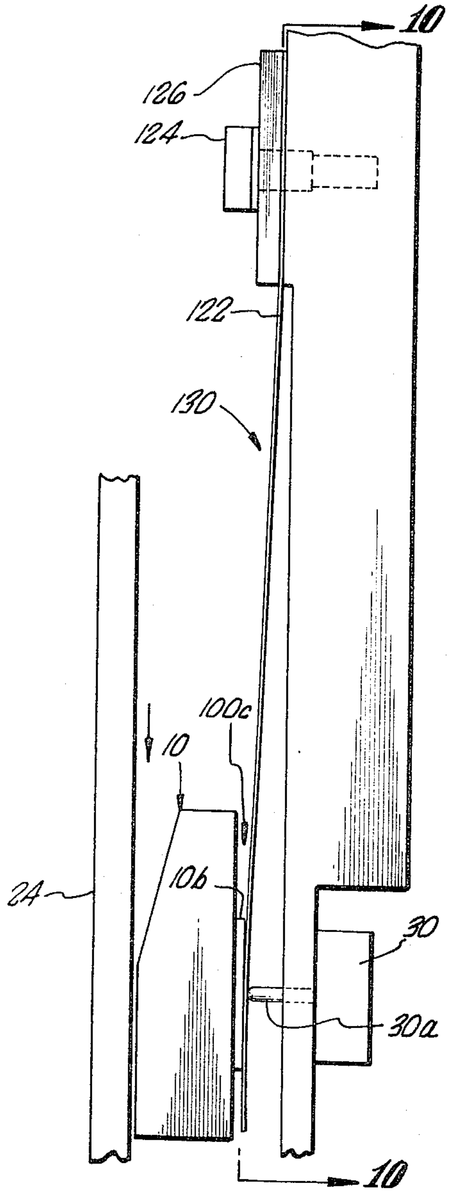
FIG. 9 is a side elevation view of a mangetic recording head assembly mounted on an alternate cantilevered head support device adjacent a portion of a rotating magnetic recording disk and shown with the magnetic recording head assembly actuated onto an air bearing formed by the rotating magnetic recording disk and embodying the present invention.
Figure 10:
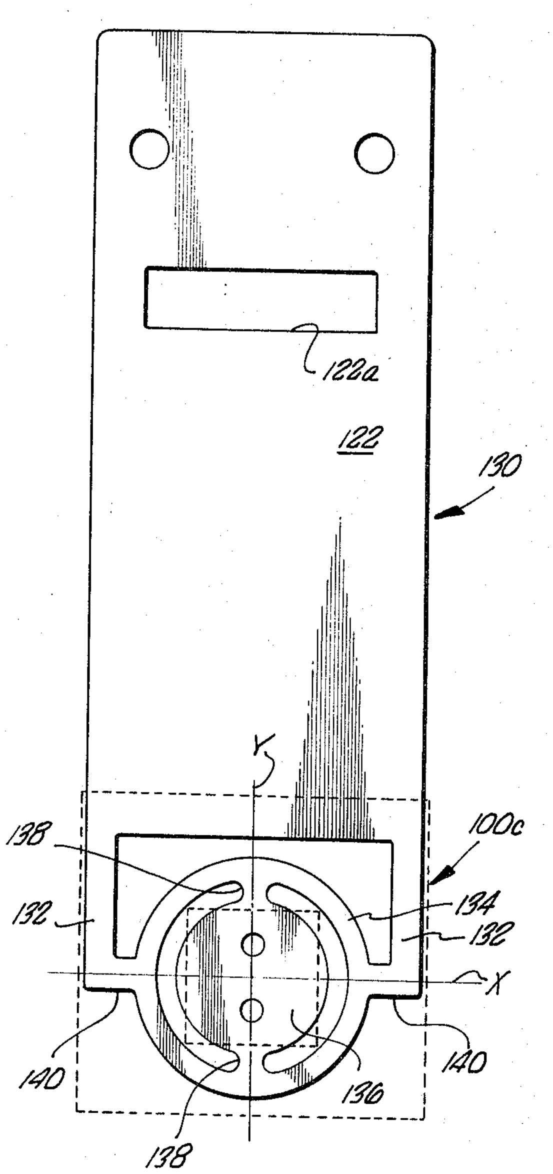
FIG. 10 is a plan view of the cantilevered head support device shown in FIG. 9 taken along the line 10—10.

Refer now to the alternate cantilevered head support device shown in FIGS. 9 and 10. FIG. 9 is a side elevation view of the magnetic head 10 mounted on an alternate cantilevered head support device 100c and actuated into a floating position with respect to the rotating magnetic recording disk 24. FIG. 10 shows a plan view of the cantilevered head support device of FIG. 9 taken along the lines 10—10 of FIG. 9. The cantilevered head support device and cantilever spring therefor is shown generally at 130. The cantilever spring is an elongated member shown at 122, one end of which is connected by means of a pair of screws 124 and a pair of washers 126 to a mounting structure similar to the cantilever spring 113 shown in FIGS. 7 and 8. The cantilever 122 includes an aperture 122a adjacent the connection to the mounting structure to provide more flexibility in the cantilever similar to aperture 113a of FIG. 8. The actual head support device 100c is located at the opposite end of the cantilever spring 122 from the connection to the mounting structure.

The head support device 100c includes an outer rotational support member 132 and a circular inner rotational support member 134. Also included in the head support device 100c is a circular head support member 136. The circular head support member 136 is connected by means of connecting members 138 to the inner rotational support member 134 at diametrically opposite points thereof. Similarly, the inner rotational support member 134 is connected by means of connecting members 140 to the outer rotational support member 132 at diametrically opposite points of the circular inner support member 134.

Referring specifically to FIG. 9, a head actuating device 30 similar to that shown in FIGS. 2 and 4 is shown in FIG. 9 including a plunger 30a. Whenever the plunger 30a is actuated, it forces the cantilevered head support device 100c towards the rotating magnetic recording disk 24. Whenever the cantilevered head support device 100c is actuated towards the magnetic recording disk 24, the elongated spring member 122 deflects allowing the head assembly 10 to be moved out towards the recording disk 24. The rest of the deflection is provided by deflection in the inner and outer support members 132 and 134 and the connecting members 138 and 140. Similar to the head support device 100 shown in FIG. 4 the head support device 130 restrains rotational movement parallel with the recording surface of the disk 24 while allowing rotational movement about a pivot point and allowing movement of the head support surface 136 (and connected head 10) perpendicular to the recording disk 24. The cantilever spring 122 and head support device 100c automatically retract the head 10 to a neutral position out of a reading and writing position when the actuator 30 retracts the plunger 30a.

Figure 11:
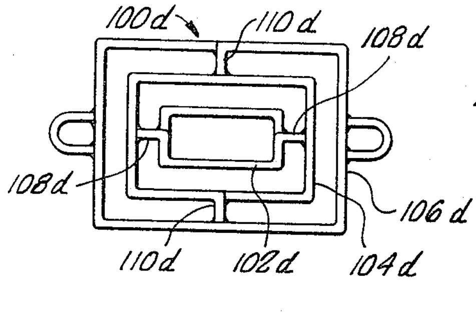
FIG. 11 is a plan view of a head support apparatus composed of a plurality of interconnected circular members and embodying the present invention.

Refer now to FIG. 11. FIG. 11 shows an alternate head support device 100d and embodying the present invention which is composed of heat treated berylium copper wires or circular members in a configuration quite similar to the head support device 100 of FIG. 4. The circular members of FIG. 11 are elastic and are arranged and welded together so as to have the rectangular head support member 102d, inner and outer rectangular support members 104d and 106d and connecting members 108d and 110d, similar to the rectangular head support surface 102, the inner and outer rectangular support members 104 and 106 and the connecting members 108 and 110 of FIG. 4. The function of the elements 102d, 104d, 106d, 108d and 110d are identical to that of the similarly numbered elements of FIG. 4.

It should be noted that the head support device of FIGS. 1 through 10 could have the perforations therein formed by milling, etching or other well known techniques. The head support device with perforations could also be formed by casting the structure in this form. Also, although the head support device of FIGS. 1 through 11 has been described as being composed of heat treated berylium copper within the scope of the present invention, it could also be formed of other materials having similar elastic characteristics. Further, the body structure of the head support device of the present invention need not be entirely flat. For example, the head support device of FIG. 4 could be deformed with each of the members 102, 104 and 106 on a different plane. Also, the members of the body structure of the head support device could be formed of rectangular, oval or other shaped members.

It should further be noted that a head support device may be constructed, within the scope of the invention as claimed, in which some or all of the support members are made of a nonelastic material. For example, making reference to FIG. 4, the connecting members such as 108 and 110 could be formed of an elastic material to allow gimbaled action whereas the support members 104 and 106 and the head support member 102 could be formed of a nonelastic material. Additionally, within the scope of the invention as claimed, the outer rotational support member 106 could be eliminated and the pair of elastic connecting members 110 connected directly to reference a support structure. Also, arrangements of the invention may be devised for supporting devices other than magnetic recording heads.

In the following claims, head assembly is meant to refer to a structure containing one or more reading and/or writing heads for use in reading and/or writing information on a recording surface. Also, magnetic recording head assembly or recording head assembly as used in the following claims is meant to refer to an assembly having at least one head therein capable of either reading and/or writing coded information on a recording surface.

What is claimed is:

1. A device for supporting a magnetic recording head assembly on a fluid bearing formed by a magnetic recording surface moving in a fluid atmosphere comprising a rectangular body structure including a head support surface adapted to be connected to the recording head assembly and further including an integral elastic body constructed for inhibiting movement of the head support surface parallel with such recording surface and having at least a first set of two parallel and elongated perforations connected by a third elongated perforation and having at least a second set of two parallel and elongated perforations connected by a sixth elongated perforation, said elongated perforations being arranged for causing the body structure to allow restrained rotational movement of such recording head support surface about a pivot point thereon.

2. A device for supporting a magnetic recording head assembly on a fluid bearing formed by a magnetic recording surface moving in a fluid atmosphere comprising an elongated plate of elastic material having a first end for mounting the plate and including a head support member at a second end opposite to said first end adapted for supporting a magnetic recording head assembly, two substantially semicircular shaped perforations in said plate symmetrically positioned about the head support member, a third perforation in said plate and encircling a portion of said semicircular perforations and a portion of said plate being removed on the other side of said first and second perforations from said third perforation, said removed portion and said perforations permitting restrained rotational movement of the head support member about a pivot point thereof and allowing the plate of material to inhibit movement of the head support member parallel with such recording surface.

3. In combination, a magnetic recording means including a recording surface moving in a fluid atmosphere, a magnetic head assembly having a surface constructed for floating on the fluid atmosphere, a support device coupled to said head assembly, means for supporting the support device with the head assembly oriented adjacent the recording surface, and means including an actuating member having an end for forcing the head assembly into a floating position on the fluid atmosphere adjacent the moving recording surface, the support device comprising rectangular shaped plate comprising an elastic material having extensions thereof connected to said supporting means and perforations therein symmetrically positioned about two axes intersecting at right angles and shaped for allowing the body structure to inhibit rotation of the head structure relative to said recording surface but causing the body structure to allow restrained rotation of the head assembly in other directions about a pivot point at the end of the actuating member and for causing the body structure to allow movement of the head assembly toward and away from the recording surface.

4. In combination, a reading or recording head structure having a surface constructed for floating on a fluid bearing, a support device coupled to said head structure comprising a substantially flat and thin body structure comprising an elastic material having perforations therein positioned and shaped for allowing the body structure to inhibit rotation of the head structure relative to a predetermined plane but causing the elasticity of the body structure to allow restrained rotation of the head structure in other directions about a desired pivot point and to allow movement of the head structure toward and away from such fluid bearing.

5. In combination, magnetic recording means including a recording surface moving in a fluid atmosphere, a magnetic head assembly constructed for floating on the fluid atmosphere, a support device coupled to said head assembly, and means for supporting the support device with the head assembly oriented adjacent the recording surface, the support device including a substantially flat and thin body structure comprising an elastic material having perforations therein positioned and shaped for allowing the body structure to inhibit rotation of the head structure relative to the recording surface but causing the elasticity of the body structure to allow restrained rotation of the head assembly in other directions about a desired pivot point thereon and for causing the elasticity of the body structure to allow restrained movement of the head assembly toward and away from the recording surface.

6. In combination, a magnetic recording means including a recording surface moving in a fluid atmosphere, a magnetic head assembly adapted for floating on the fluid atmosphere, a support device coupled to said head assembly, means for supporting the support device with the head assembly oriented adjacent the recording surface, and means including an actuating member having an end for forcing the head assembly into a floating position on the fluid atmosphere adjacent the moving recording surface, the support device including a substantially flat and thin body structure comprising an elastic material having perforations therein positioned and shaped for allowing the body structure to inhibit rotation of the head structure relative to said recording surface but causing the elasticity of the body structure to allow restrained rotation of the head assembly in other directions about a pivot point at the end of the actuating member and for causing the elasticity of the body structure to allow movement of the head assembly toward and away from the recording surface.

7. A device arranged for guiding and supporting a magnetic recording head with respect to a fluid atmosphere adjacent a moving magnetic recording surface comprising an integral thin and flat elastic body having an integral head support member and integral rectangular inner and outer rotational support members both substantially encircling the head support member, a first pair of connecting members positioned along a first straight line for connecting the head support member at opposite sides thereof to said first rotational support member and a second pair of connecting members positioned along a second straight line perpendicular to said first line for connecting the first rotational support member at opposite sides thereof to the second rotational support member, said connecting members and rotational support members inhibiting rotation of the head support member relative to a predetermined plane but causing the elasticity of the body to permit restrained rotational movement of the head support member in other directions about a pivot point on such plane.

8. In combination, a magnetic recording head assembly having a surface constructed for floating on a fluid atmosphere, and a support device comprising a thin flat elastic body having an integral and substantially recangular head support member coupled to the recording head and integral rectangular inner and outer rotational support members substantially encircling the head support member, a first pair of connecting members positioned along a first straight line for connecting the head support member at opposite sides thereof to said first rotational support member, and a second pair of connecting members positioned along a second straight line intersecting and perpendicular to said first line for connecting the first rotational support member at opposite sides thereof to the second rotational support member, said connecting members and rotational support members inhibiting rotation of the recording head relative to a plane parallel with said first and second lines and the elasticity of the connecting members and rotational support members allowing restrained rotational movement of the recording head in other directions about a pivot point on such plane.

9. In a storage system the combination comprising a rotating magnetic recording disk including a recording surface moving in a fluid atmosphere at a sufficient velocity to form a fluid bearing for supporting a magnetic recording head assembly, a magnetic recording head having a surface constructed for floating on the fluid bearing, a head support device comprising a flat and thin elastic body having an integral substantially recangular head support member coupled to the head assembly and integral rectangular inner and outer rotational support members substantially encircling the head support member, means connected for supporting the head support device such that the magnetic head assembly is adjacent the recording surface, said thin elastic body additionally comprising a first pair of connecting members positioned along a first straight line for connecting the head support member at opposite points thereof to said first rotational support member and a second pair of connecting members positioned along a second straight line perpendicular to said first line for connecting the inner support member at opposite points thereof to the outer support member, and means including an actuating member having an end for forcing the head assembly onto the fluid bearing, said connecting members and inner and outer support members inhibiting movement of the head assembly parallel with the recording surface and the elasticity of said inner and outer rotational support members allowing restrained rotational movement of the head assembly about the end of the actuating member.

10. A support device comprising a load support member and a network of interconnected elastic and rectangular shaped members coupled to the load support member such that the elasticity thereof allows restrained rotational movement of the load support member about a pivot point and said rectangular shaped members inhibit movement of the load support member parallel with a predetermined plane therethrough.

11. In combination, a magnetic head structure having a surface constructed for floating on a fluid atmospheric bearing, and a support device comprising a load support member connected to the head structure and a network of interconnected elastic and rectangular shaped members lying in a predetermined plane and interconnected such that elasticity thereof allows restrained rotational movement of the head structure about a pivot point thereon and said rectangular shaped members inhibit movement of the head structure parallel with said predetermined plane.

12. A cantilevered support device comprising an elongated elastic member having an end, a substantially flat elastic body structure connected to the end of said elongated elastic member and having a load support surface and adapted for inhibiting movement of the load support surface parallel with such surface and including perforations therein causing elasticity of the body structure to permit restrained rotational movement of the support surface in other directions about a pivot point thereon.

References Cited by the Examiner

UNITED STATES PATENTS 3,051,954 8/1962 Osterlund ---------- 179—100.2
3,239,804 3/1966 Elskamp et al. --------- 267—1

BERNARD KONICK, *Primary Examiner.*

M. BERNARD, V. P. CANNEY, *Assistant Examiners.*

UNITED STATES PATENT OFFICE
CERTIFICATE OF CORRECTION

Patent No. 3,310,792 March 21, 1967

Robert G. Groom et al.

It is hereby certified that error appears in the above numbered patent requiring correction and that the said Letters Patent should read as corrected below.

Column 2, line 21, after "single" insert -- thin --.

Signed and sealed this 7th day of November 1967.

(SEAL)
Attest:

Edward M. Fletcher, Jr.
Attesting Officer

EDWARD J. BRENNER
Commissioner of Patents